(12) United States Patent
Nishimori et al.

(10) Patent No.: US 6,641,680 B2
(45) Date of Patent: Nov. 4, 2003

(54) PROCESS FOR PRODUCING INNER RACE FOR CONSTANT VELOCITY JOINT HAVING IMPROVED WORKABILITY AND STRENGTH

(75) Inventors: Hiroshi Nishimori, Himeji (JP); Makoto Iguchi, Himeji (JP); Yoshimi Usui, Mooka (JP)

(73) Assignees: Sanyo Special Steel Co., Ltd., Hyogo-Ken (JP); Honda Giken Kogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/171,091

(22) Filed: Jun. 13, 2002

(65) Prior Publication Data

US 2003/0051771 A1 Mar. 20, 2003

(30) Foreign Application Priority Data

Jun. 14, 2001 (JP) ........................ 2001-179752

(51) Int. Cl.⁷ .............................. C23C 8/22; C21D 9/00
(52) U.S. Cl. ........................ 148/229; 148/233
(58) Field of Search ................. 148/226, 229, 148/233

(56) References Cited

U.S. PATENT DOCUMENTS

| | | | | |
|---|---|---|---|---|
| 3,954,517 A | * | 5/1976 | Jatczak et al. | 148/233 |
| 6,126,897 A | * | 10/2000 | Aihara et al. | 420/106 |
| 2003/0047242 A1 | * | 3/2003 | Nishimori et al. | |

* cited by examiner

*Primary Examiner*—Sikyin Ip
(74) *Attorney, Agent, or Firm*—Webb Ziesenheim Logsdon Orkin & Hanson, P.C.

(57) ABSTRACT

Disclosed is a process for producing an inner race for a constant velocity joint comprising the steps of: providing a steel comprising by weight carbon 0.10 to 0.25%, silicon 0.03 to 0.15%, manganese 0.20 to 0.60%, sulfur 0.003 to 0.030%, chromium 1.00 to 1.50%, titanium 0.05 to 0.20%, boron 0.0005 to 0.0050%, and nitrogen not more than 0.01% with the balance consisting of iron and impurities; hot rolling or hot forging the steel, to prepare a rolled/forged product; cold forging and machining the rolled/forged product; and carburizing, quenching, and tempering the machined rolled/forged product so that the treated steel satisfies an effective case depth of 0.4 to 0.9 mm, a thickness of abnormal-carburizing layer of not more than 15 μm, and an austenite grain size number as specified in JIS G 0551 of not less than 7.

1 Claim, 1 Drawing Sheet

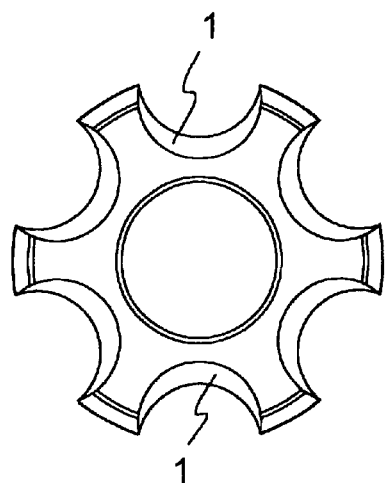
FIG. IA
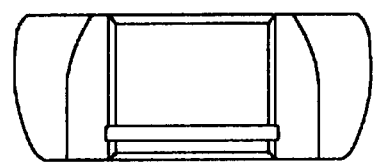
FIG. IB
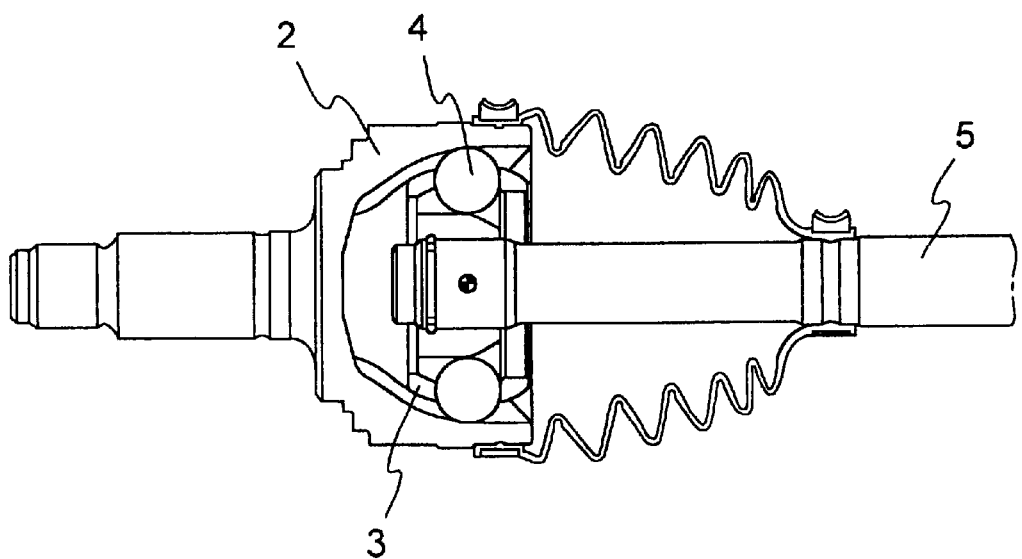
FIG. 2

PROCESS FOR PRODUCING INNER RACE FOR CONSTANT VELOCITY JOINT HAVING IMPROVED WORKABILITY AND STRENGTH

BACKGROUND OF THE INVENTION

1. Technical Field

The present invention relates to a process for producing an inner race for a constant velocity joint, having improved cold workability, machinability, rolling fatigue life and flexural strength, as a boron-containing automobile component.

2. Background Art

SCM 420 steel (see JIS G 4105 (1979)) or a steel corresponding to SCM 420 steel has hitherto been carburized, quenched, and tempered before use for an inner race for an automobile constant velocity joint. In recent years, however, a reduction in weight of components is necessary for realizing an improvement in fuel consumption from the viewpoint of global environmental problems. On the other hand, working properties such as cold forgeability and machinability should not be sacrificed from the viewpoint of reducing the production cost. To this end, the development of an inner race for a constant velocity joint having improved rolling fatigue life and flexural strength without sacrificing cold forgeability and machinability is necessary.

SUMMARY OF THE INVENTION

The present inventors have now found that, in order to improve the rolling fatigue life, the abnormal-carburizing layer should be reduced in a rolling face not subjected to polishing and, in order to improve the flexural strength, the brittle fracture region should be reduced. Based on such finding, the present inventors have found optimal additive elements and amounts of added elements while taking into consideration cold workability and machinability, and have further found a suitable range of an effective case depth at the time of carburization/quenching, which has led to the completion of the present invention.

Accordingly, it is an object of the present invention to provide an inner race using SCM 420 (JIS) or a steel corresponding to SCM 420 for a constant velocity joint for the automobiles or the like, having improved rolling fatigue life and flexural strength properties without sacrificing cold forgeability and machinability.

According to the present invention, there is provided a process for producing an inner race for a constant velocity joint having improved workability and strength properties, said process comprising the steps of:

providing a steel comprising by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities;

hot rolling or hot forging the steel, and optionally subjecting the steel to softening heat treatment, to prepare a rolled/forged product having a Rockwell hardness of not more than 75 HRB;

cold forging and machining the rolled/forged product to impart a shape of the inner race for a constant velocity joint; and carburizing, quenching, and tempering the machined rolled/forged product so that the treated steel satisfies an effective case depth of 0.4 to 0.9 mm, a thickness of abnormal-carburizing layer of not more than 15 μm, and an austenite grain size number as specified in JIS G 0551 of not less than 7, said effective case depth being defined as the distance from the surface of the steel to the position of the steel in its depth direction where the Vickers hardness is HV 550.

In the present invention, an improvement in rolling fatigue life in a rolling face not subjected to polishing has been made by reducing the contents of silicon and manganese having high affinity for oxygen in the chemical composition of the steel and reducing an abnormal-carburizing layer which has notch effect and is further soft. Further, since silicon and manganese are ferrite strengthening elements, reducing the contents of these elements can improve cold workability and machinability.

Furthermore, according to the present invention, boron is added to improve grain boundary strength, and, in addition, titanium is added to form titanium carbide or titanium carbonitride which suppress the growth of grains at the time of carburization after cold working to bring the austenite grain size number specified in JIS to not less than 7. This has reduced brittle fracture.

Furthermore, according to the present invention, the limitation of the effective case depth of the carburized layer defined as the distance from the surface of the steel to the position of the steel in its depth direction, where the Vickers hardness is HV 550, has reduced flexural load stress concentrated on the carburized layer and brittle cracking in an early stage at the time of flexural stress loading. This could realize increased strength.

Specifically, the present invention is directed to a process for producing an inner race for a constant velocity joint shown in FIG. 1 for automobiles or the like, having improved rolling fatigue life and flexural strength properties without sacrificing cold workability and machinability, using a steel product having the above chemical composition.

BRIEF DESCRIPTION OF THE DRAWINGS

FIGS. 1A and 1B are diagrams partly in cutaway and partly in simplification, showing the shape of an inner race 1 for a constant velocity joint which is used in a torsional strength test, wherein FIG. 1A is a plan view and FIG. 1B a front view; and FIG. 2 is an assembly diagram of an inner race 1, an outer race 2, a ball 4, a retainer 3, and a drive shaft 5 in a constant velocity joint at the time of a torsional strength test and a rolling life test.

DETAILED DESCRIPTION OF THE INVENTION

In the process for producing an inner race for a constant velocity joint having improved workability and strength properties according to the present invention, a steel is first provided which comprises by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities.

The reasons for the limitation of constituents in the steel used in the production process according to the present invention will be described. In the following description, "%" is by weight.

Carbon (C): Carbon is an element which significantly improves hardenability and is necessary for improving flexural strength. When the content of carbon is less than 0.10%, satisfactory strength cannot be provided. On the other hand, a carbon content exceeding 0.25% increases the hardness of the as-hot-forged steel or the hardness of the steel after softening heat treatment. This deteriorates cold workability and machinability and, in addition, deteriorates impact properties. For this reason, the carbon content is limited to 0.10 to 0.25%.

Silicon (Si): Silicon is an element which is necessary for deoxidation. When the content of silicon is less than 0.03%, the contemplated effect is unsatisfactory. On the other hand, a silicon content exceeding 0.15% increases hardness after annealing and deteriorates cold workability and machinability. Further, in this case, the depth of the abnormal-carburizing layer formed at the time of carburization is large, resulting in deteriorated rolling fatigue life. For this reason, the silicon content is limited to 0.03 to 0.15%.

Manganese (Mn): Manganese is inexpensive and is an element necessary for ensuring the hardenability. When the content of manganese is less than 0.20%, the contemplated effect is unsatisfactory. On the other hand, a manganese content exceeding 0.60% increases hardness. This deteriorates cold workability and machinability. Further, in this case, the depth of the abnormal-carburizing layer formed at the time of carburization is large, resulting in deteriorated rolling fatigue life. For this reason, the manganese content is limited to 0.20 to 0.60%.

Sulfur (S): Sulfur is an element that forms MnS and TiS in the steel, which improves machinability. When the content of sulfur is less than 0.003%, the contemplated effect is small. On the other hand, when the sulfur content exceeds 0.030%, the limit of cold crack generation is lowered. Therefore, the sulfur content is limited to 0.003 to 0.030%.

Chromium (Cr): Chromium is an element which is useful for improving hardenability and ensuring strength. When the content of chromium is less than 1.00%, strength high enough for use as a component cannot be provided. On the other hand, the addition of chromium in an amount exceeding 1.50% leads to an increase in hardness and deteriorates cold workability and machinability. Further, in this case, the depth of the abnormal-carburizing layer formed at the time of carburization is large, resulting in deteriorated rolling fatigue life. For this reason, the chromium content is limited to 1.00 to 1.50%.

Titanium (Ti): Titanium is an element that fixes free nitrogen contained in the steel to promote the effect of improving the hardenability improvement effect of boron and, at the same time, forms carbide and carbonitride which contribute to the refinement of grains. Further, the face fatigue strengthening is improved by virtue of dispersion strength by fine carbide and carbonitride. When the content of titanium is less than 0.05%, however, the effect of refining grains is small. On the other hand, a titanium content exceeding 0.20% results in the saturation of this effect and, in addition, increases hardness. Therefore, the titanium content is limited to 0.05 to 0.20%.

Boron (B): Boron is an element which segregates at grain boundaries to improve grain boundary strength and significantly improves hardenability. When the content of boron is less than 0.0005%, the contemplated effect is unsatisfactory, while the addition of boron in an amount exceeding 0.0050% deteriorates the hardenability. For this reason, the boron content is limited to 0.0005 to 0.0050%.

Nitrogen (N): Nitrogen, when it is contained in an amount exceeding 0.01%, leads to an increased amount of TiN which deteriorates the machinability. Thus, the nitrogen content is limited to not more than 0.01%.

Molybdenum (Mo) and nickel (Ni): Molybdenum and nickel are elements which increase the hardness of the steel and deteriorates workability and machinability. Therefore, preferably, molybdenum and nickel are not substantially contained in the steel except for the presence of molybdenum and nickel as inevitable impurities.

In the production process according to the present invention, a steel having the above chemical composition is hot rolled or hot forged and is optionally subjected to softening heat treatment to prepare a rolled/forged product having a Rockwell hardness of not more than 75 HRB. The Rockwell hardness can be measured according to JIS Z 2245 (1998). When the hardness of the as-hot-rolled or as-hot-forged product or the hardness after the softening heat treatment is higher than 75 HRB, the cold workability is deteriorated. For this reason, the hardness is limited to not more than 75 HRB.

According to a preferred embodiment of the present invention, after hot rolling or hot forging, the rolled/forged product may be machined. Alternatively, according to a preferred embodiment of the present invention, the rolled/forged product, which has been softened by softening heat treatment after hot rolling or hot forging, may be machined.

In the production process according to the present invention, the rolled/forged product is cold forged and machined to impart the shape of an inner race for a constant velocity joint.

In the production process according to the present invention, the machined rolled/forged product is carburized, quenched, and tempered so that the treated steel satisfies an effective case depth of 0.4 to 0.9 mm, a thickness of abnormal-carburizing layer of not more than 15 $\mu$m, and an austenite grain size number specified in JIS G 0551 of not less than 7.

This effective case depth refers to the thickness (depth) of a layer having a Vickers hardness of not less than HV 550 formed on the surface of the steel and is defined as the distance from the surface of the steel to the position of the steel in its depth direction where the Vickers hardness is HV 550. The Vickers hardness HV may be measured according to JIS Z 2244 (1998). The effective case depth may be measured according to JIS G 0557 (1996). The effective case depth after the carburization/quenching/tempering is limited to the above-defined range for the following reason. After carburization/quenching/tempering, when the effective case depth is less than 0.4 mm, the rolling face is collapsed by the ball, making it impossible for the inner race to function. On the other hand, when the effective case depth exceeds 0.9 mm, the length of brittle crack caused by flexural stress is so large that the strength is lowered and, consequently, strength necessary for the inner race cannot be ensured. For this reason, the effective case depth is limited to 0.4 to 0.9 mm.

The abnormal-carburizing layer is an intergranular oxide layer and an incompletely quench-hardened soft layer derived from a lack of hardenability improving element around the layer attributable to the formation of the intergranular oxide layer, and, in the rolling face not subjected to polishing after carburization, the soft surface layer portion induces a lowering in rolling life. When the thickness of the abnormal-carburizing layer exceeds 15 $\mu$m, the deterioration in service life is significant. Therefore, the thickness of the abnormal-carburizing layer is limited to not more than 15 $\mu$m. The thickness of the abnormal-carburizing layer may be measured by subjecting a sample, which has been cut perpendicularly to the surface of the carburized layer, to nital corrosion, and microscopically observing the surface of the carburized layer.

When the austenite grain size number after carburization/quenching is less than 7, the brittle fracture region is significantly increased, resulting in lowered flexural strength. For this reason, the austentie grain size number is limited to not less than 7.

EXAMPLES

Embodiments of the present invention will be described with reference to the following examples and comparative examples.

The chemical compositions of steels in the examples and comparative examples are shown in Nos. 1 to 8 in Table 1. In the table, "steel of inv." refers to the steel according to the present invention. Steel Nos. 1 and 2 of the present invention respectively have the same chemical compositions as steels of SCM 420 and SCM 415 specified in JIS G 4105 (1979), except that the content of silicon and the content of manganese have been lowered, the content of chromium has been increased, and boron and titanium have been added. On the other hand, comparative steel No. 3 is a steel of SCM 420, and comparative steel No. 4 is a steel of SNCM 420 specified in JIS G 4103 (1979).

Comparative steel No. 5 has the same chemical composition as a steel of SCM 415, except that the content of manganese has been lowered, the content of chromium has been increased, and boron and titanium have been added. Comparative steel No. 5 has the same chemical composition as steel No. 1 of the present invention, except that the content of chromium has been significantly increased. Comparative steel No. 7 has the same chemical composition as steel No. 1 of the present invention, except that boron has not been added. Comparative steel No. 8 has the same chemical composition as steel No. 1 of the present invention, except that the content of titanium has been lowered.

Products thus obtained were tested as follows. The results are shown below.

In consideration of maximum load conditions applied to the inner race in automobiles, as shown in FIG. 2, an inner race as a component to be evaluated and components of a constant velocity joint, i.e., an outer race 2, a retainer 3, balls 4, and a drive shaft 5, were assembled into a constant velocity joint. In the evaluation, with the outer race 2 fixed, a torsional torque was loaded in such a state that the drive shaft 5 was inclined at 40 degrees to the outer race 2 to apply high flexural stress to the spline portion of the inner race 1. The effective case depth of the carburized layer was regarded as the position where the hardness was 550 HV as measured with a Vickers hardness meter. The hardness after annealing was measured with a Rockwell hardness meter.

In the rolling fatigue life test, the test was carried out for 100 hr in such a state that a given pressure was applied. In this case, the rolling fatigue life was evaluated in terms of pressure at which, among six rolling ball grooves, even one rolling ball groove was separated. Specifically, the higher the pressure at which the separation occurs, the better the rolling fatigue life.

The hardness after the spheroidization annealing is shown in Table 1. By virtue of the lowered silicon and manganese contents, steel No. 1 of the present invention and comparative steel Nos. 7 and 8 have lower hardness than SCM 420 as comparative steel No. 3 which has the same carbon content as these steels and is a steel specified in JIS. Steel No. 2 of the present invention was softened because of lower carbon content. Comparative steel Nos. 4, 5, and 6 had higher hardness than the steels of the present invention because they respectively have higher nickel, silicon, or chromium content.

TABLE 1

| | | | | | | | | | | | | | (weight %) Hardness after |
| No. | C | Si | Mn | P | S | Ni | Cr | Mo | B | Ti | Al | N | annealing (HRB) |
| --- | --- | --- | --- | --- | --- | --- | --- | --- | --- | --- | --- | --- | --- |
| Steel of inv. | | | | | | | | | | | | | |
| 1 | 0.20 | 0.09 | 0.35 | 0.012 | 0.015 | — | 1.37 | — | 0.0013 | 0.142 | 0.019 | 0.0065 | 70 |
| 2 | 0.15 | 0.10 | 0.42 | 0.012 | 0.016 | — | 1.40 | — | 0.0011 | 0.125 | 0.020 | 0.0064 | 68 |
| Comp. steel | | | | | | | | | | | | | |
| 3 | 0.20 | 0.24 | 0.81 | 0.013 | 0.017 | — | 1.13 | 0.15 | — | — | 0.025 | 0.0149 | 68 |
| 4 | 0.20 | 0.25 | 0.60 | 0.011 | 0.018 | 1.63 | 0.47 | 0.20 | — | — | 0.028 | 0.0155 | 82 |
| 5 | 0.16 | 0.25 | 0.36 | 0.013 | 0.012 | — | 1.41 | — | 0.0010 | 0.133 | 0.024 | 0.0058 | 72 |
| 6 | 0.21 | 0.14 | 0.48 | 0.013 | 0.017 | — | 1.80 | — | 0.0011 | 0.155 | 0.021 | 0.0064 | 77 |
| 7 | 0.21 | 0.09 | 0.36 | 0.014 | 0.015 | — | 1.40 | — | — | 0.145 | 0.019 | 0.0071 | 70 |
| 8 | 0.19 | 0.09 | 0.40 | 0.013 | 0.016 | — | 1.39 | — | 0.0011 | 0.02 | 0.024 | 0.0148 | 69 |

100 kg of each of the steel products having chemical compositions (weight %; balance consisting essentially of iron) shown in Table 1 was produced by the melt process in a vacuum melting furnace. These steels were then heated to 1250° C. and were hot forged into φ45, followed by spheroidization annealing for softening. Machining was then carried out to prepare billets having a size of φ38×30 mm. The billets were cold forged into the shape of inner races which were then machined to prepare inner races having a shape shown in FIG. 1. The inner races were then carburized, quenched, and tempered. Specifically, the inner races were subjected to holding at 880° C. for 3 hr followed by oil cooling to 130° C. and tempering at 180° C. for one hr. The inner races then turned and polished to prepare final products. In this case, the rolling face 1 was maintained in the carburized state and remained unpolished.

The results of measurement of the effective case depth after carburization/quenching, together with the results of the static torsion test, are shown in Table 2. For both steel Nos. 1 and 2 of the present invention, as compared with comparative steel No. 3, grain boundary strengthening could be provided by virtue of the addition of boron, and grains were fined by the addition of titanium, contributing to excellent strength. For comparative steel No. 4, the high hardness poses problems of cold forgeability and machinability, although the breaking torque was high because nickel was added. For comparative steel Nos. 5 and 6, the grain boundary strenghthening and fine graining effect provided high strength. On the other hand, for comparative steel No. 7, grain boundary strengthening was not provided because boron was not added, and, for comparative steel No. 8, the grain size was large because titanium was not added.

Consequently, in these steels, strength comparable with the steels of the present invention could not be provided.

TABLE 2

|  | Steel of inv. | | Comp. steel | | | | | |
| --- | --- | --- | --- | --- | --- | --- | --- | --- |
| No. | 1 | 2 | 3 | 4 | 5 | 6 | 7 | 8 |
| Effective case depth, mm | 0.77 | 0.75 | 0.86 | 0.84 | 0.79 | 0.81 | 0.64 | 0.79 |
| Grain size No. | 10.4 | 10.4 | 8.0 | 8.3 | 10.1 | 10.2 | 10.4 | 6.8 |
| Breaking torque, kgf. m | 377 | 379 | 327 | 381 | 374 | 370 | 318 | 347 |

In order to examine the influence of the carburized depth, the static torsional strength was measured using steel No. 1 of the present invention having an effective case depth in the range of 0.4 to 1.2 mm. The results are shown in Table 3.

TABLE 3

| Effective case depth, mm | 0.41 | 0.52 | 0.61 | 0.68 | 0.77 | 0.90 | 1.01 | 1.19 |
| --- | --- | --- | --- | --- | --- | --- | --- | --- |
| Breaking torque, kgf. m | 396 | 391 | 390 | 382 | 377 | 369 | 338 | 327 |

Decreasing the effective case depth causes a reduction in brittle fracture region which increases the strength. In this case, however, when the effective case depth is less than 0.4 mm, the rolling face is collapsed, and the function of the inner race is lost. On the other hand, when the effective case depth exceeds 0.9 mm, the brittle fracture region is significantly increased, resulting in significantly deteriorated strength. Therefore, the effective case depth should be 0.4 to 0.9 mm from the viewpoint of ensuring strength necessary for the inner race.

A rolling fatigue life test was carried out using inner races, which were carburized, quenched, and tempered. Specifically, the inner races were subjected to holding at 880° C. for 3 hr followed by oil cooling to 130° C. and tempering at 180° C. for one hr, to bring the effective case depth after the carburization to 0.4 to 0.9 mm. The results are shown in Table 4.

TABLE 4

|  | Steel of inv. | | Comp. steel | | | | | |
| --- | --- | --- | --- | --- | --- | --- | --- | --- |
| No. | 1 | 2 | 3 | 4 | 5 | 6 | 7 | 8 |
| Abnormal-carburizing layer, $\mu$m | 8 | 10 | 18 | 17 | 20 | 16 | 9 | 9 |
| Pressure necessary for causing separation, kgf/mm$^2$ | 259 | 254 | 212 | 217 | 228 | 231 | 255 | 242 |

For steel Nos. 1 and 2 of the present invention and comparative steel Nos. 7 and 8, by virtue of lowered silicon and manganese contents, the thickness of the abnormal-carburizing layer was smaller than that of the abnormal-carburizing layer for comparative steel Nos. 3, 4, 5, and 6. For the ball rolling grooves as the testing face in the rolling fatigue life test, since the surface layer portion was not removed by polishing or the like after carburization/ quenching/tempering, the pressure necessary for causing the separation for steel Nos. 1 and 2 of the present invention and comparative steel Nos. 7 and 8 was higher than that for comparative steel Nos. 3, 4, 5, and 6 by virtue of cracking suppression effect attained by the reduction in abnormal-carburizing layer. Among them, steel Nos. 1 and 2 of the present invention and comparative steel No. 7, wherein titanium was added, had particularly high strength.

As is apparent from the foregoing description, the process for producing an inner race for a constant velocity joint according to the present invention has the following effects.

1) The addition of 0.05 to 0.20% of titanium and 0.0005 to 0.0050% of boron in the chemical composition of the steel fines grains and strengthens grain boundaries, and this can realize the production of an inner race for a constant velocity joint having excellent flexural strength properties.

2) Further, the limitation of the amount of silicon and manganese added can realize the production of an inner race for a constant velocity joint which has excellent rolling fatigue life properties by virtue of the reduced abnormal-carburizing layer without sacrificing cold workability and machinability.

3) The limitation of the effective case depth at the time of carburization/quenching can realize the production of an inner race for a constant velocity joint having excellent flexural properties.

Thus, according to the present invention, an inner race for a constant velocity joint having excellent strength properties can be produced without sacrificing the machinability, and a reduction in weight of automobiles can be realized.

What is claimed is:

1. A process for producing an inner race for a constant velocity joint having improved workability and strength properties, said process comprising the steps of:

providing a steel comprising by weight carbon (C): 10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities;

hot rolling or hot forging the steel, and optionally subjecting the steel to softening heat treatment, to prepare a rolled/forged product having a Rockwell hardness of not more than 75 HRB;

cold forging and machining the rolled/forged product to impart a shape of the inner race for a constant velocity joint; and carburizing, quenching, and tempering the machined rolled/forged product so that the treated steel satisfies an effective case depth of 0.4 to 0.9 mm, a thickness of abnormal-carburizing layer of not more than 15 $\mu$m, and an austenite grain size number as specified in JIS G 0551 of not less than 7, said effective case depth being defined as the distance from the surface of the steel to the position of the steel in its depth direction where the Vickers hardness is HV 550.

* * * * *

UNITED STATES PATENT AND TRADEMARK OFFICE
CERTIFICATE OF CORRECTION

PATENT NO.    : 6,641,680 B2
DATED         : November 4, 2003
INVENTOR(S)   : Hiroshi Nishimori et al.

It is certified that error appears in the above-identified patent and that said Letters Patent is hereby corrected as shown below:

<u>Column 5,</u>
Line 25, "steel No. 5" should read -- steel No. 6 --.

<u>Column 9,</u>
Line 5, "10" should read -- 0.10 --.

Signed and Sealed this

Twentieth Day of April, 2004

JON W. DUDAS
*Acting Director of the United States Patent and Trademark Office*